(No Model.)
C. P. & D. B. TIPTON.
FEED VALVE FOR COMPENSATING FOR LEAKAGE IN TRAIN PIPES.
No. 601,602. Patented Mar. 29, 1898.
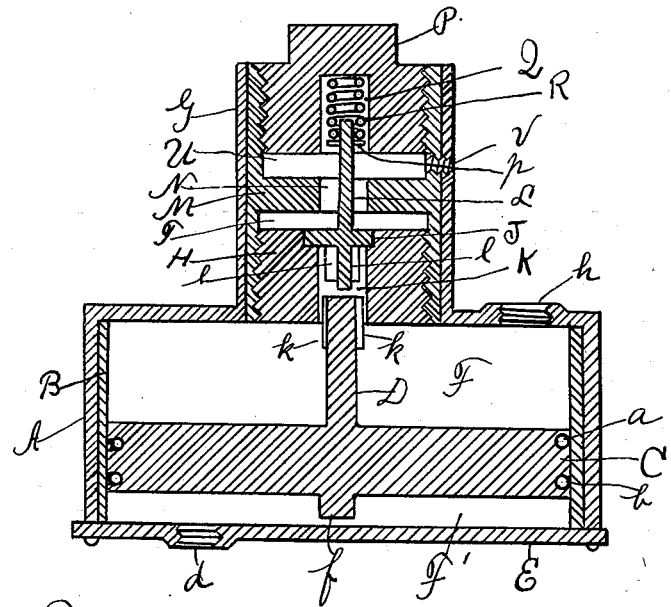
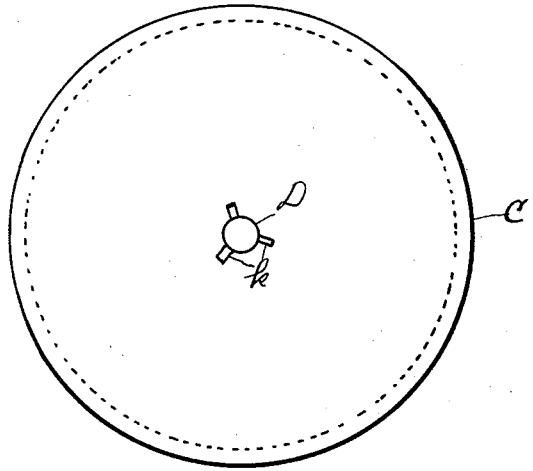
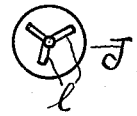
Witnesses
R. E. L. Roy.
B. F. Bouldin.
Inventors,
C. P. Tipton and
D. B. Tipton.
By their Attorney,
A. D. Jackson

UNITED STATES PATENT OFFICE.

COMMODORE P. TIPTON AND DAVID B. TIPTON, OF COMMERCE, TEXAS.

FEED-VALVE FOR COMPENSATING FOR LEAKAGE IN TRAIN-PIPES.

SPECIFICATION forming part of Letters Patent No. 601,602, dated March 29, 1898.

Application filed July 6, 1897. Serial No. 643,618. (No model.)

*To all whom it may concern:*

Be it known that we, COMMODORE P. TIPTON and DAVID B. TIPTON, citizens of the United States, residing at Commerce, Texas, have invented a Feed-Valve for Compensating for Leakage in Train-Pipes, of which the following is a specification.

This invention relates to a valve for compensating the loss by leakage of fluid in leaky train-pipes in fluid-pressure brake systems; and the objects are to construct a valve that will hold the train-line pressure equal to the pressure of the little drum or brake-valve reservoir without releasing the brakes when the brakes are applied, that will hold the maximum pressure in the train-pipe and prevent further reduction on account of the leakage in the train-pipe until the engineer reduces it by means of the brake-valve, and that will equalize the train-line pressure and the pressure of the brake-valve reservoir without releasing the brakes when the brakes are applied and in this way prevent the brakes from feeding on too tight. The cause of the brakes being applied too tight is the leakage in the train-pipe, and this leakage causes the pressure from the auxiliary reservoir to feed in the brake-cylinders. This allows too much pressure to go into the brake-cylinders when it is not needed. This causes the brakes to be applied with too much power before such power is needed. It often happens that trains are stopped before they reach the desired stopping-place, and the engineer has to release the brakes, and thus they cannot stop the trains at the proper places. The leakage is supplied by allowing air from the main air-reservoir to flow into the train-pipe. A valve of this character is most useful in mountainous districts and especially on long grades. It gives the engineer perfect control of his train even if there is leakage in the train-pipe. If there is leaking in the train-pipe in going downgrade, the brakes would feed on so tight that the engineer would be compelled to release the brakes and recharge the train-pipes and auxiliary reservoirs. While doing this with the ordinary braking mechanism, the train would attain a dangerous speed on long steep grades.

Other objects and advantages will be fully understood from the following description and claims when read in connection with the accompanying drawings.

Reference is had to the accompanying drawings, forming a part of this specification.

Figure 1 is a longitudinal sectional view of the valve. Fig. 2 is an end view of a feed-valve; Fig. 3, an end view of the main piston.

Similar characters of reference indicate similar parts throughout the several views.

The main cylinder A has a bushing B for the piston C to work in. Piston C is provided with a rod D and packing-rings $a$ $b$. The cylinder A has a head E, provided with a port $d$ for receiving pressure from the little drum or brake-valve reservoir. The space F', between the cylinder-head and the piston $c$, is about one-half inch. A buffer $f$ on the piston comes within one-sixteenth of an inch of the cylinder-head. The chamber F for train-line pressure is about one inch long and about three and one-half inches in diameter. This chamber is provided with a port $h$ about one-half inch in diameter for connecting the valve to train-pipe. The neck G of the valve has a plug or bushing H, which has a valve-seat for the valve J and a passage K for the main-piston rod. The main piston-rod has wings $k$, which are used to keep the piston-rod in correct alinement. It is preferable to screw the bushing H in the neck from the valve-chamber. The valve J is about one-half inch in diameter. This valve is mounted on a rod or stem L, which may be made integral therewith and extends below the valve J and has wings $l$. The object of the wings is to guide valve J to its seat and not to allow it to be cramped or cocked. The partition M constitutes an upper valve-seat for valve J. This partition may be made integral with the valve-neck, and it has a passage N for the rod or stem L. The cap or top nut P has a seat Q cut therein for a spring R, which is mounted on stem L and fastened to this stem by means of a cross-pin $p$. The object of this spring is to make the valve J more sensitive in closing and to close the upper valve-seat. The object of the upper valve-seat in partition M is to cut off feed from main reservoir to train-pipe in emergency applications. In such applications the pressure in chamber F or train-pipe pressure will be reduced and the pressure from the little drum will cause the main-piston rod to close the upper valve-seat with valve J. The neck of the valve may have a bushing S, but it can be constructed without such bushing. The chamber or space T is about one-quarter of an inch, so that the valve J will have about one-fourth of an inch travel. The space or chamber U is also about one-fourth of an inch and is provided with a port V about one-quarter of an inch for receiving main-reservoir pressure.

The operation of the valve may be described as follows: This valve is mounted in a convenient place on the engine adjacent to the usual parts forming the air-brake apparatus and connected with the main reservoir by means of port V, with train-line by means of port $h$, and with the little drum or brake-valve reservoir by means of port $d$, and is never brought into operation unless there is a leakage of the train-line while the brakes are applied. When a leak commences, the pressure in chamber F decreases and the piston will follow the weaker pressure. The piston will be driven by pressure from the brake-valve reservoir and the piston-rod will raise valve J just enough to supply the leak, the pressure coming from the main reservoir through port V and under the valve J through passage K. In emergency applications the piston C forces valve J to its upper seat and holds it closed. Consequently no pressure can come from the main reservoir into the train-pipe. This causes the brakes to be held in application with the greatest power. The pressure in chambers T and U will be ninety pounds and in chambers F and F' will be seventy pounds. Consequently when valve J is opened the greater pressure in chambers T and U will force its way into chamber F, thence into the train-pipe.

Having fully described our invention, what we claim as new, and desire to secure by Letters Patent, is—

1. A feed-valve to compensate leakage in train-pipes of fluid-pressure brake systems, said valve having a suitable chamber and a piston therein, a train-pipe connection on one side of said piston, a brake-valve-reservoir connection on the other side, a main air-reservoir connection in the other end of said chamber, a valve adapted to cut off said connection from said train-pipe connection, and means for opening said valve, whereby air may be fed from the main air-reservoir to the train-pipes.

2. A feed-valve to compensate leakage of train-pipes in fluid-pressure brake systems, said valve having a chamber divided into a plurality of apartments, a piston provided with a suitable rod in one end of said chamber, a brake-valve-reservoir connection on one side of said piston, a train-pipe connection on the other side, a valve mounted in the other end of said chamber provided with two seats, and means for operating and closing said valve whereby connection is made with the main reservoir, said means consisting of said piston and rod and a stem projecting from said valve.

3. A feed-valve for compensating the leakage of train-pipes in fluid-pressure brake systems, said valve having a suitable casing provided with a plurality of chambers, a main air-reservoir connection with one of said chambers, a train-pipe connection, and a brake-valve-reservoir connection, a piston operating between said last-named connections, a valve for feeding fluid-pressure from said main air-reservoir connection to said train-pipe connection, the piston-rod of said piston being adapted to open said valve when a leakage in the train-pipe commences.

4. A feed-valve for compensating leakage of train-pipes in fluid-pressure brake systems, said valve having a suitable casing provided with a chamber and a connection therewith of the brake-valve reservoir, and a connection therewith of the train-pipe, a piston in said chamber operating between the pressure from said connections, a main air-reservoir connection, a plug having a passage therethrough, separating the pressure from said connection from the pressure from said train-pipe, a valve for closing said passage, said valve being provided with an upper seat, whereby pressure is cut off from said main air-reservoir in emergency applications, and means for operating said valve.

5. A feed-valve provided with suitable chambers for compensating the loss by leakage of train-pipes in fluid-pressure brake systems, said chambers having connections with the train-pipe and the brake-valve reservoir, a piston separating the pressures from said connections, a main air-reservoir, a bushing having a passage therethrough and a valve-seat therein, a valve adapted to rest in said seat and to cut off the supply of pressure from said main air-reservoir, said valve having a stem provided with wings to aid in holding the stem in correct alinement, said piston-rods having wings for guiding said rod.

6. In a feed-valve for compensating for leakage in train-pipes provided with a suitable casing, the combination of a brake-valve-reservoir connection, a train-pipe connection, a piston operating between said connections, a main air-reservoir connection, and a valve for opening and closing said last-named connection whereby pressure in the train-pipes is restored to the pressure in the brake-valve reservoir by pressure flowing from the main air-reservoir connection.

In testimony whereof we set our hands in the presence of two witnesses.

COMMODORE P. TIPTON.
DAVID B. TIPTON.

Witnesses:
A. L. CARR,
O. C. MULKEY.